(12) United States Patent
Tokiwa et al.

(10) Patent No.: US 7,702,234 B2
(45) Date of Patent: Apr. 20, 2010

(54) IMAGE-TAKING APPARATUS

(75) Inventors: Kentaro Tokiwa, Asaka (JP); Kouhei Awazu, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 826 days.

(21) Appl. No.: 11/599,427

(22) Filed: Nov. 15, 2006

(65) Prior Publication Data

US 2007/0110426 A1 May 17, 2007

(30) Foreign Application Priority Data

Nov. 16, 2005 (JP) ............... 2005-331305

(51) Int. Cl.
G03B 15/03 (2006.01)
(52) U.S. Cl. .................. 396/155; 396/166; 396/172; 396/205; 396/265
(58) Field of Classification Search ............... 396/155, 396/166, 205
See application file for complete search history.

(56) References Cited

U.S. PATENT DOCUMENTS

2005/0088568 A1* 4/2005 Uenaka ............... 348/370
2005/0089322 A1* 4/2005 Uenaka ............... 396/157
2005/0179810 A1* 8/2005 Okamura ............... 348/371
2006/0203122 A1* 9/2006 Tokuyama et al. ......... 348/370
2008/0075448 A1* 3/2008 Awazu ............... 396/205
2009/0122181 A1* 5/2009 Matsui ............... 348/370

FOREIGN PATENT DOCUMENTS

JP 2001-358988 A 12/2001
JP 2005-128413 A 5/2005
JP 2005-134711 A 5/2005

* cited by examiner

Primary Examiner—W. B. Perkey
(74) Attorney, Agent, or Firm—Sughrue Mion, PLLC

(57) ABSTRACT

An image-taking apparatus includes: an A/D conversion circuit having an amplifier that is capable of amplifying image signals per shooting frame; and a gain changer that changes the gain of the amplifier. The apparatus causes the gain changer to increase the gain of the amplifier up to a level that compensates for a gradual decrease in the amount of light emitted from LEDs that occurs during continuous shooting. As a result, the amplitude level of every image signal is made constant and thus, replayed images of the same brightness shot during the continuous shooting are obtained.

8 Claims, 13 Drawing Sheets

IMAGE-TAKING APPARATUS

BACKGROUND OF THE INVENTION

1. Field of the Invention

The present invention relates to an image-taking apparatus that includes an imaging device and an image-taking optical system, and generates image signals representing a subject image formed on the imaging device through the image-taking optical system.

2. Description of the Related Art

There have been proposed techniques for employing a light-emitting diode (LED) as a light source in place of a xenon tube (see Japanese Patent Application Publications No. 2005-128413 and No. 2005-134711 for example). Use of the LED eliminates the constraints of the time for recharging a main capacitor and thus, it is possible to emit shooting fill light at any desired time.

Generally, when subject luminance is insufficient in multiple exposures or continuous shooting, fill light is emitted in a pulse at every shooting time so that subject luminance for each shooting is secured. If an LED is used in this type of shooting, it is possible to emit a predetermined amount of fill light at any desired time, because the LED is free from the constraints of the time for recharging a main capacitor as mentioned above.

However, LEDs have such a problem that the amount of light emitted from an LED gradually decreases with the passage of light-emission time.

FIG. 1 is a diagram showing the relationship between the light-emission time of an LED and the mount of light emitted from the LED. FIG. 2 is a diagram showing a gradual decrease in the amount of light emitted from the LED in continuous shooting. In FIGS. 1 and 2, the lateral axis indicates "time" while the vertical indicates the "amount of light" emitted from the LED.

LED has such a feature that its light-emission efficiency decreases as its temperature increases. Therefore, as shown in FIG. 1, the amount of light from the LED gradually decreases over the light-emission time. When light emission of an LED having such a tendency is used for continuous shooting or multiple exposures, there arises not only a problem that the amount of light emitted at one shooting gradually decreases over the time as shown in FIG. 1, but also another problem that the amount of light emitted at each shooting time during continuous shooting gradually decreases as the number of shot images increases as shown in FIG. 2. When the amount of emitted light gradually decreases in this way, a shortfall in the amount of light supplied to an imaging device becomes greater as the number of shot images increases. As a result, the brightness of images shot later becomes lower than that of images shot earlier among images shot during continuous shooting.

Japanese Patent Application Publications No. 2005-128413 and No. 2005-134711 provide multiple LEDs and divide them into several groups. The LED groups are caused to emit light at different shooting times in order to suppress the increase in temperature of the LEDs. However, incorporation of multiple LEDs in an image-taking apparatus increases the size of the image-taking apparatus. Recent LEDs can emit a relatively large amount of light as compared to LEDs in the past, but it is still smaller than the amount of light emitted from of xenon tubes. Use of such LEDs capable of emitting a larger amount light makes it possible to decrease the size of an image-taking apparatus by decreasing the number of LEDs.

Meanwhile, Japanese Patent Application Publication No. 2001-358988 discloses a technique for emitting fill light after increasing sensitivity by changing the gain in Automatic Gain Control (AGC) when a main capacitor has not yet been fully recharged. However, the technique disclosed in this document relates to a xenon tube, and thus it has nothing to do with an LED.

SUMMARY OF THE INVENTION

The present invention has been made in view of the above circumstances, and provides an image-taking apparatus that is capable of keeping the brightness of images shot later equal to the brightness of images shot earlier among images shot during continuous shooting, without increasing the number of LEDs.

A first image-taking apparatus of the invention an image-taking apparatus that includes an imaging device and an image-taking optical system, and generates per-shooting image signals representing a subject image formed on the imaging device through the image-taking optical system, the apparatus including:

a light-emitting section that includes an LED and causes the LED to emit fill light toward a subject;

a light-emission driving section that drives the LED in synchronism with a shooting requiring fill light; and a signal-amplifying section that amplifies the image signals by increasing an amplification factor according to the number of shot images, up to a level that compensates for a gradual decrease in the amount of emitted light that occurs due to an increase in temperature of the LED, while the LED is repeating light emission in synchronism with every shooting, during continuous shooting requiring fill light.

The first image-taking apparatus gradually increases the amplification factor of the signal-amplifying section that amplifies image signals generated by the imaging device per shooting, up to a level that compensates for a gradual decrease in the amount of light emitted from the LED. When the signal-amplifying section includes, for example, a table indicating the relationship between the number of shot images and the gradual decrease in the amount of emitted light that occurs due to an increase in the temperature of the LED, it is possible to increase the amplification factor according to the number of shot images by referring to the table.

When the amplification factor of the signal-amplifying section is thus increased so as to compensate for the gradual decrease in the amount of light emitted from the LED, the amplitude level of every image signal can be always held constant. As well known, the amplitude level of every image signal forming an image contains a luminance component and thus, the brightness of the image formed by the image signals can be made constant.

As described above, the invention realizes an image-taking apparatus that can keep the brightness of images shot later equal to the brightness of images shot earlier during continuous shooting, without increasing the number of LEDs.

A second image-taking apparatus of the invention is an image-taking apparatus that includes an imaging device and an image-taking optical system, and generates per-shooting image signals representing a subject image formed on the imaging device through the image-taking optical system, the apparatus including:

a light-emitting section that includes an LED and causes the LED to emit fill light toward a subject; and a light-emission driving section that drives the LED in synchronism with a shooting requiring fill light, wherein the light-emission driving section raises a driving level for driving the LED according to the number of shot images, up to a level that compensates for a gradual decrease in the amount of emitted light that occurs due to an increase in temperature of the LED while the LED is repeating light emission in synchronism with every shooting during continuous shooting requiring fill light.

In the first image-taking apparatus, the luminance component contained in image signals is sufficiently secured by increasing the amplification factor of the image signals. Alternatively, as in the second image-taking apparatus, the amount of fill light emitted from the LED may be increased by raising the driving level for driving the LED, so that the sufficient amount of light is supplied to the imaging device. The driving level may be increased by extending the time for driving the LED or by raising the peak of the driving signal for driving the LED, according to the number of shot images, with reference to a table similar to the above-described table.

However, when it is configured to emit an amount of fill light obtained by extending the time for driving the LED, the time for emitting fill light is likely to become longer than exposure time. As a result, the amount of light supplied to the imaging device becomes insufficient, which is undesirable.

In view of the foregoing, the second image-taking apparatus preferably further includes an exposure section that adjusts exposure time such that the exposure time becomes equal to or above emission time over which the LED emits light at a single shooting, during continuous shooting requiring fill light.

When it is necessary to emit fill light for a time longer than exposure time, the exposure section adjusts exposure time by extending it, so that shooting is carried out with fill light emitted over the extended exposure time.

This additional feature makes it possible to supply the imaging device with an appropriate amount of light, because the full amount of fill light is emitted to the imaging device within the exposure time.

A third image-taking apparatus of the invention is an image-taking apparatus that includes an imaging device and an image-taking optical system, and generates per-shooting image signals representing a subject image formed on the imaging device through the image-taking optical system, the apparatus including:

a light-emitting section that includes an LED and causes the LED to emit fill light toward a subject;

a light-emission driving section that drives the LED in synchronism with a shooting requiring fill light; and a shooting control section that extends a shooting interval according to the number of shot images, up to a length that prevents a decrease in the amount of emitted light that occurs due to an increase in temperature of the LED, while the LED is repeating light emission in synchronism with every shooting, during continuous shooting requiring fill light.

According to the third image-taking apparatus of the invention, the shooting control section makes a shooting interval between shootings longer as the number of shot images increases during continuous shooting.

In the third image-taking apparatus, it is possible to secure a sufficient length of time for cooling the LED, because the shooting control section extends a shooting interval between one shooting and the next shooting when the temperature of the LED has increased due to fill light emitted at the one shooting. Therefore, at the next shooting, fill light is emitted after the temperature of the LED has returned to a normal temperature for operation. If a table or the like is prepared as in the first and second image-taking apparatus, it is possible to desirably extend the shooing interval based on a result of referring to the table.

Instead of using a table employed in the first through third image-taking apparatus, the amount of light actually emitted from the LED may be monitored so as to obtain data indicating a gradual decrease in the amount of light. In this case, the brightness can be kept constant by adjusting the amplification factor or the amount of light emitted from the LED based on a result of the monitoring.

A fourth image-taking apparatus of the invention is an image-taking apparatus that includes an imaging device and an image-taking optical system, and generates per-shooting image signals representing a subject image formed on the imaging device through the image-taking optical system, the apparatus including:

a light-emitting section that includes an LED and a light-amount monitor for monitoring the amount of light emitted from the LED, and causes the LED to emit fill light toward a subject;

a light-emission driving section that drives the LED in synchronism with a shooting requiring fill light; and a signal-amplifying section that determines, based on a value obtained by the light-amount monitor as a result of monitoring a change in the amount of light emitted from the LED that occurs while the LED is repeating light emission in synchronism with every shooting during continuous shooting requiring fill light, an amplification factor for amplifying image signals to be obtained at a subsequent shooting, and amplifies the image signals obtained at the subsequent shooting with the determined amplification factor.

In the first image-taking apparatus, the amplification factor of the signal-amplifying section is determined with reference to the table or the like. However, the fourth image-taking apparatus has been improved such that the light-amount monitor is provided to monitor the amount of emitted light, and the amplification factor to be used at the next shooting is determined based on a result of the monitoring.

This makes it possible to control the gain of the amplifier with higher precision because the light-amount monitor monitors the amount of light emitted from the LED at each shooting.

A fifth image-taking apparatus of the invention is an image-taking apparatus that includes an imaging device and an image-taking optical system, and generates per-shooting image signals representing a subject image formed on the imaging device through the image-taking optical system, the apparatus including:

a light-emitting section that includes an LED and a light-amount monitor for monitoring the amount of light emitted from the LED, and causes the LED to emit fill light toward a subject; and a light-emission driving section that drives the LED in synchronism with a shooting requiring fill light, wherein the light-emission driving section determines, based on a value obtained by the light-amount monitor as a result of monitoring a change in the amount of light emitted from the LED that occurs while the LED is repeating light emission in synchronism with every shooting during continuous shooting requiring fill light, a driving level to be used for driving the LED at a subsequent shooting, and drives the LED with the determined driving level at the subsequent shooting.

The fifth image-taking apparatus further includes an exposure section that adjusts exposure time such that the exposure time becomes equal to or above emission time over which the LED emits light at a single shooting, during continuous shooting requiring fill light.

In the second image-taking apparatus, the driving level for driving the LED is determined with reference to the table or the like. However, the fifth image-taking apparatus has been improved such that the light-amount monitor is provided to monitor the amount of emitted light, and the driving level to be used at the next shooting is determined based on a result of the monitoring.

This makes it possible to control the driving level with higher precision because the light-amount monitor monitors the amount of light emitted from the LED at each shooting.

A sixth image-taking apparatus of the invention is an image-taking apparatus that includes an imaging device and an image-taking optical system, and generates per-shooting image signals representing a subject image formed on the imaging device through the image-taking optical system, the apparatus including:

a light-emitting section that includes an LED and a light-amount monitor for monitoring the amount of light emitted from the LED, and causes the LED to emit fill light toward a subject;

a light-emission driving section that drives the LED in synchronism with a shooting requiring fill light; and a shooting control section that adjusts an interval between shootings, based on a value obtained by the light-amount monitor as a result of monitoring a change in the amount of light emitted from the LED that occurs while the LED is repeating light emission in synchronism with every shooting during continuous shooting requiring fill light.

In the third image-taking apparatus, the shooting interval is determined with reference to the table or the like. However, the sixth image-taking apparatus has been improved such that the light-amount monitor is provided to monitor the amount of emitted light, and the shooting interval to be used for the next shooting is determined based on a result of the monitoring.

This makes it possible to control the shooting interval with higher precision because the light-amount monitor monitors the amount of light emitted from the LED at each shooting.

As described above, the invention realizes image-taking apparatus capable of keeping the brightness of images shot later equal to the brightness of images shot earlier among images shot during continuous shooting, without increasing the number of LEDs.

DETAILED DESCRIPTION OF THE INVENTION

Embodiment(s) of the present invention will be described with reference to the drawings.

Figure 3A:
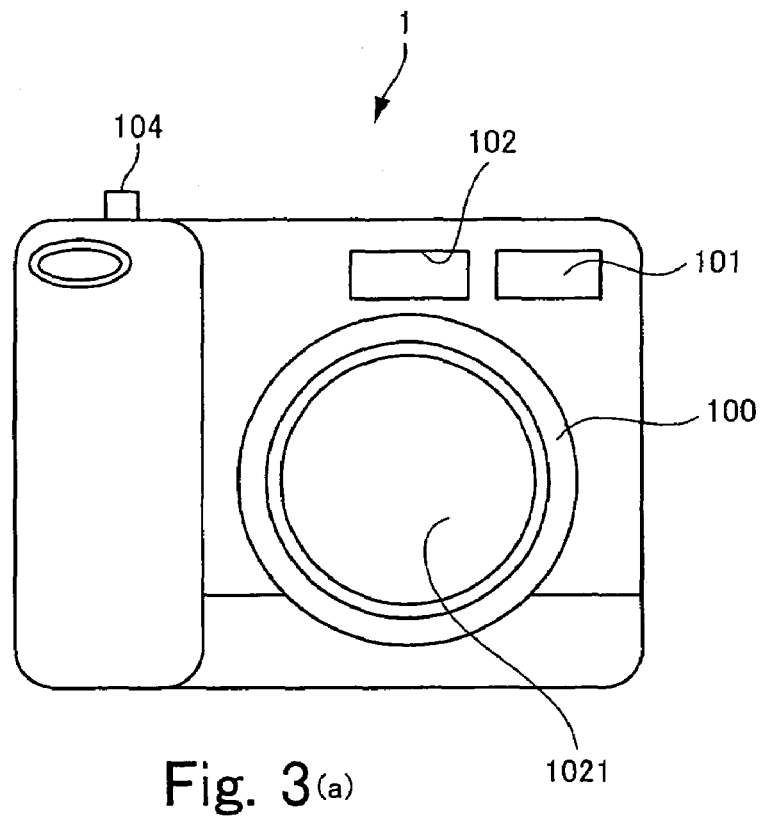
FIGS. 3(a) and 3(b) are external views of a digital camera according to an embodiment of the invention.
Figure 3B:
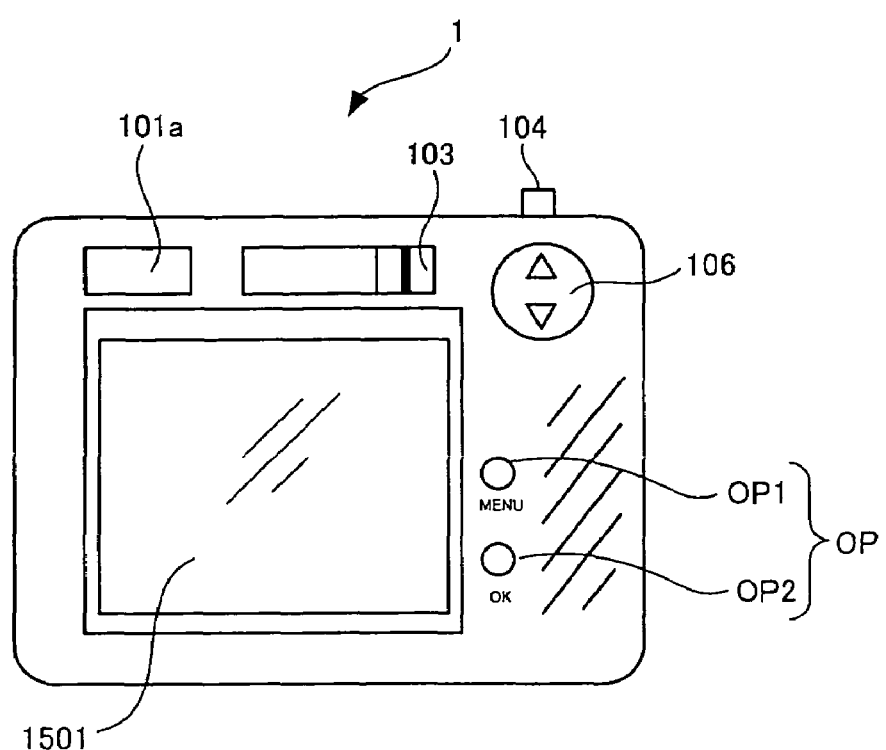

FIGS. 3(a) and 3(b) are external views of a digital camera 1 according to an embodiment of the invention.

FIGS. 3(a) and 3(b) illustrate the front and the back of the digital camera 1, respectively.

As shown in FIG. 3(a), the digital camera 1 has a lens barrel 100 on its front face. The barrel 100 has a built-in shooting lens group 1021. In addition, a light-emission window 102 is disposed above the lens barrel 100, and a finder 101 is disposed next to the light-emission window 102. Fill light is emitted through the light-emission window 102 toward a subject, when a system control circuit that will be described later determines that emission of fill light is necessary. Further, a release button 104 is disposed on the top face of the body of the digital camera 1.

As shown in FIG. 3(b), a display screen 1501 is disposed on the back face of the digital camera 1. Above the display screen 1501, there are disposed an objective window 101a for the finder 101, a mode switch 103 and an operation key 106 that also serves as a zoom switch. Next to the display screen 1501, there is a menu button OP1. Multiple shooting modes prepared in the digital camera 1 are displayed on the display screen 1501 when the menu button OP1 is operated. When any of the shooting modes is selected through the operation key 106 while these modes are displayed on the display screen 1501 and then, an OK button OP2 disposed beside the display screen 1501 is pressed to set the selected shooting mode. The shooting modes include a continuous-firing mode and a multiple-exposure mode as continuous shooting modes.

For example, when the continuous-firing mode is selected by user operation through the operation key 106, the display screen 1501 displays a set-up screen where a user can set the number of shooting frames and a shooting interval as desired based on the contents displayed on the set-up screen.

Incidentally, the digital camera 1 also has operation members such as a switch for turning on/off image display, although they are not shown in the drawings.

Figure 4:
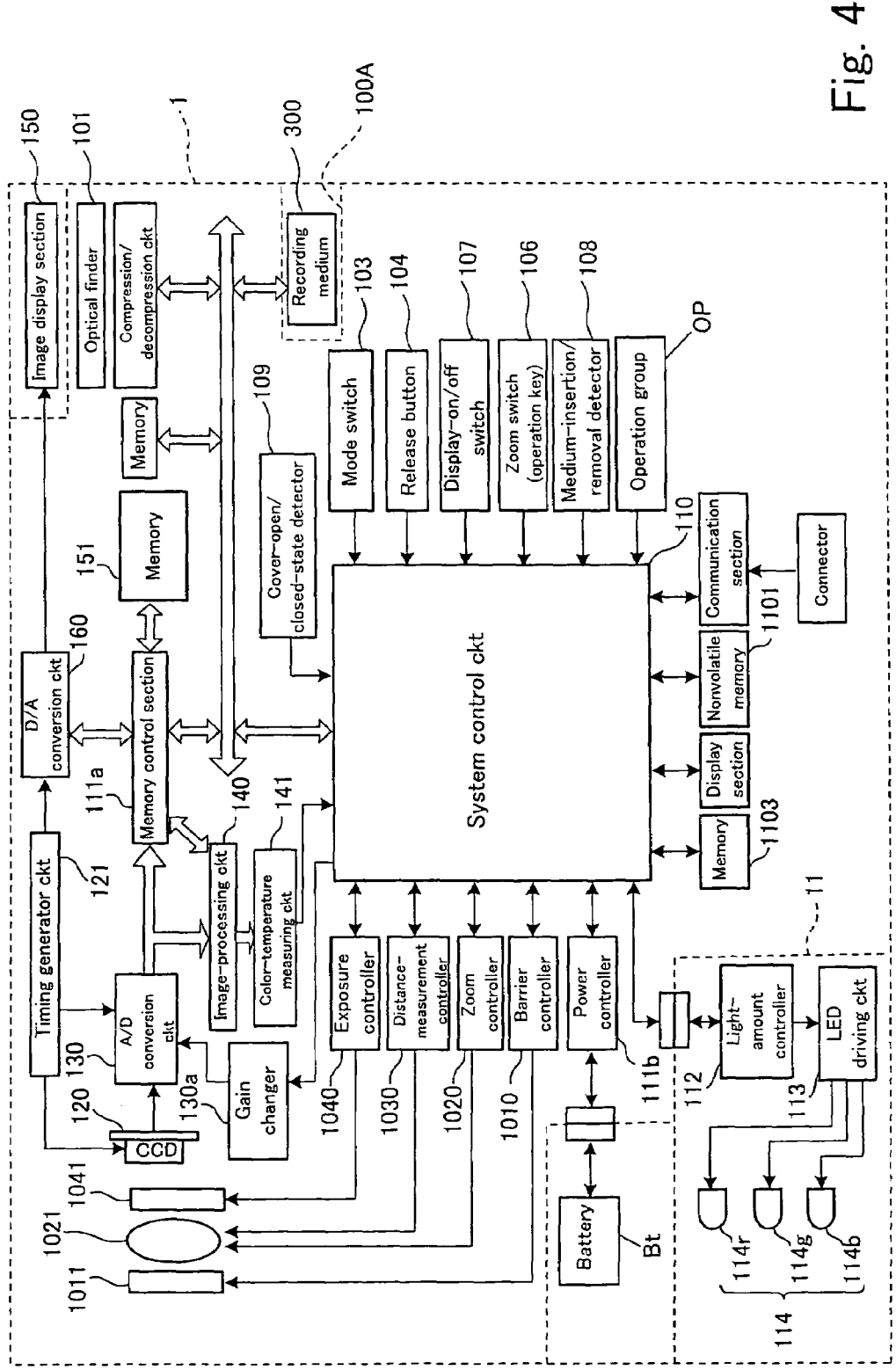
FIG. 4 is a block diagram illustrating an internal configuration of the digital camera shown in FIGS. 3(a) and 3(b)

FIG. 4 is a block diagram illustrating an internal configuration of the digital camera 1 shown in FIGS. 3(a) and 3(b).

The internal configuration of the digital camera 1 will be described with reference to FIG. 4.

The digital camera 1 of the embodiment includes a system control circuit 110 that controls all processing in the digital camera 1. Connected to an input section of the system control circuit 110 are operation members including the mode switch 103, the release button 104, the operation key 106 that also serves as a zoom switch, and an operation group OP representing the buttons OP1 and OP2 shown in FIGS. 3(a) and 3(b). Upon receipt of an operation signal generated by user operation through any of these operation members, the system control circuit 110 starts processing associated with the operated member. The release button 104 is so configured as to supply an instruction to the system control circuit 110 by the toggle action to carry out continuous shooting. In response to the release button 104 being pressed, the system control circuit 110 starts shooting processing and continuously performs the shooting processing afterwards. Then, in response to the release button 104 being pressed again, the system control circuit 110 stops the shooting operation.

Although not shown in FIGS. 3(a) and 3(b), the digital camera 1 of the embodiment includes a medium-accommodating chamber 100A and a recording medium (memory chard) 300 that is removably inserted into the medium-accommodating chamber 100A. Data presenting a shot image is recorded in the memory card 300 when it is inserted into the medium-accommodating chamber 100A. Therefore, the digital camera 1 also includes a detector 108 for detecting insertion/removal of a recording medium into/from the medium-accommodating chamber 100A. Further, although not shown in FIGS. 3(a) and 3(b), the digital camera 1 also includes a switch 107 for turning on/off image display, which is disposed on the back of the digital camera 1. Furthermore, although not shown in FIGS. 3(a) and 3(b), the digital camera 1 also includes a protection cover for protecting the surface of a panel of the display screen 1501 disposed on the back of the digital camera 1 and thus includes a detector 109 for detecting open/closed state of the protection cover. Signals from the switch 107, the detector 108 and the detector 109 are also supplied to the system control circuit 110. Therefore, the system control circuit 110 is configured to perform processing according to these signals upon receipt of them.

The system control circuit 110 shown in FIG. 4 is configured to instruct a zoom controller 1020, in response to user operation through the zoom switch 106 serving as one of the operation members, to move a zoom lens included in the shooting lens group 1021. The system control circuit 110 is also configured to instruct a distance-measurement controller 1030 to move a focus lens included in the shooting lens group 1021 according to a result of TTL distance measurement that will be described later.

In the embodiment, the system control circuit 110 includes a TTL metering section and a TTL distance-measuring section that respectively perform TTL metering and TTL distance measurement based on image signals generated by a CCD solid-state imaging device 120 (hereinafter referred to as CCD 120). The system control circuit 110 further includes a white-balance adjusting section. Imaged at a generated by the CCD 120 is supplied through an image-processing circuit 140 to a color-temperature measuring circuit 141 where color temperature is measured. Based on the result of the color temperature measurement, the white-balance adjusting section in the system control circuit 110 performs optimum white-balance adjustment.

In addition, the system control circuit 110 is so configured as to instruct an exposure controller 1040 to adjust the aperture of a diaphragm 1041 according to a metered value obtained by the TTL metering. The system control circuit 110 is also configured to determine whether it is necessary to emit fill light for shooting or not. The system control circuit 110 is also configured to determine a shutter speed (sec.) according to the metered value obtained by the TTL metering. The system control circuit 110 then notifies a timing generator circuit 121 of the determined shutter speed, thereby causing the timing generator circuit 121 to supply a timing signal according to the shutter speed to the CCD 120, so that a subject image having an appropriate light amount can be formed on the photosensitive surface of the CCD 120.

When the system control circuit 110 determines that it is necessary to emit fill light for shooting, the system control circuit 110 instructs a light-amount controller 112 provided in a light-emitting section 11 to activate an LED driving circuit 113, so that the LED driving circuit 113 causes an LED 114r for emitting red light, an LED 114g for emitting green light and an LED 114b for emitting blue light to emit fill light to a subject by driving these LEDs. Hereinafter, the three LEDs 114r, 114g and 114b may be collectively referred to as an LED 114. In this example, three LEDs capable of emitting a relatively large amount of light are employed so that fill light can be emitted from the minimum possible number of LEDs.

Use of the LED 114 as a light source in this way makes it possible to freely set up the emission interval without being affected by constraints of capacitor recharging time that is essential to a conventional xenon tube, thereby to emit fill light at any desired time. In addition, since it is possible to emit three primary colors; red, green and blue light, by changing the proportion of these colors, fill light can be emitted according to a white balance obtained by the system control circuit 110 as well as the color temperature of a subject field.

In order to address the above-described problems, the embodiment employs three LEDs capable of emitting a relatively large amount of light that is mentioned as an example of recent conventional LEDs, so as to reduce the number of LEDs as much as possible, thereby reducing the size of the digital camera 1. Further, in order to make up for the gradually decreased amount of light emitted from the LEDs, the embodiment provides an amplifier in an A/D conversion circuit 130 so that the level of an image signal output from the CCD 120 can be adjusted.

In this example, the amount of emitted fill light that is gradually decreased during continuous shooting is compensated for as follows. First, in order to carry out continuous shooting, the system control circuit 110 causes, via the light-amount controller 112, the LED driving circuit 113 to drive the LED 114 in synchronism with each shooting, thereby enabling the LED 114 to emit fill light for shooting to a subject. While light emission is repeated in synchronism with each shooting by the LED 114 during the continuous shooting, the amount of emitted light is gradually decreased due to a gradual increase in the temperature of the LED 114. To compensate for the decreased amount of light, the system control circuit 110 instructs a gain changer 130a to increase the gain (amplification factor) of the amplifier (signal amplifier) incorporated in the A/D conversion circuit 130.

In this example, data that represents the relationship between the number of shot images and the amplifier's gain essential to compensation for the decreased amount of light from the LED 114 is obtained and stored beforehand in the form of a table in a memory 1103 prepared within the system control circuit 110. During continuous shooting, the system control circuit 110 counts the number of shot images with a built-in counter, and reads out again (amplification factor) corresponding to the count, i.e. the number of shot images, from the table. Subsequently, the system control circuit 110 instructs the gain changer 130a to set the read-out gain in the amplifier of the A/D conversion circuit 130.

Figure 1:
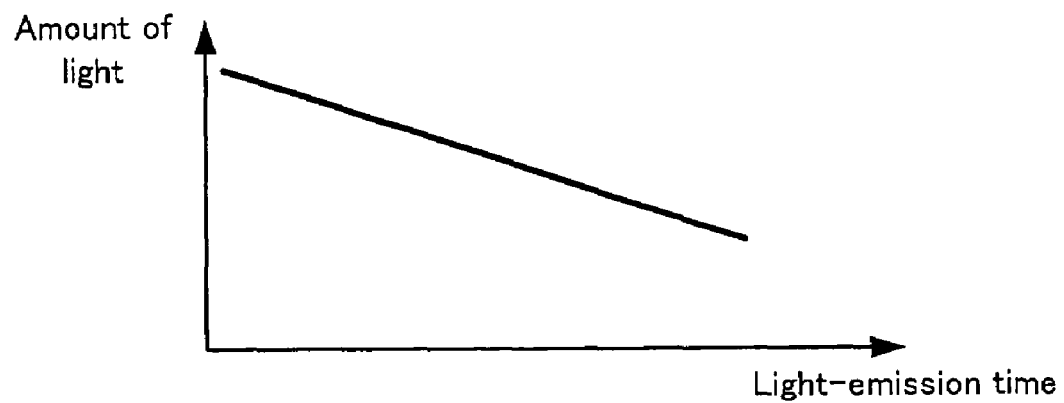
FIG. 1 is a diagram showing the relationship between the light-emission time of an LED and the mount of light emitted from the LED.
Figure 2:
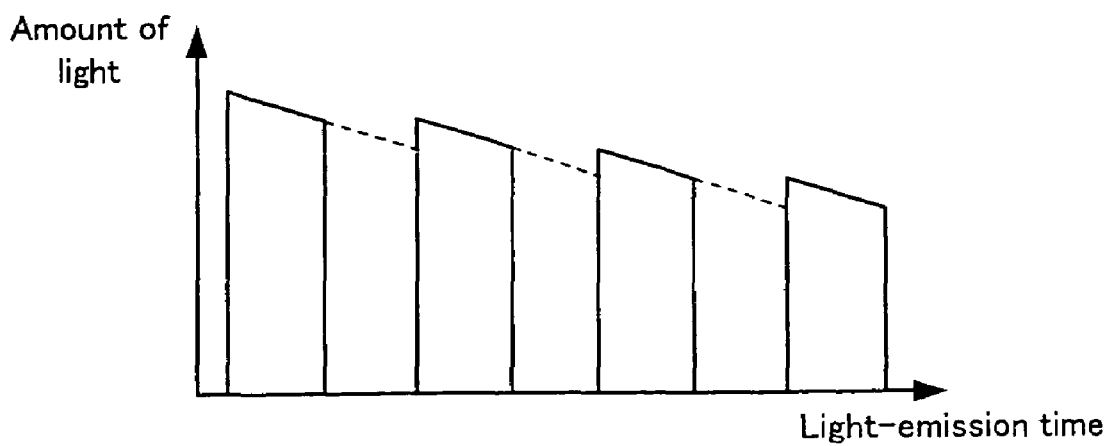
FIG. 2 is a diagram showing a gradual decrease in the amount of light emitted from an LED in continuous shooting.

This configuration makes it possible to keep the amplitude level of image signals at a constant level by increasing the gain (amplification factor) of the amplifier (signal amplifier) in the A/D conversion circuit 130, even if the amount of light from the LED 114 is gradually decreased in a manner as shown in FIG. 1. It is well known that image signals include components representing luminance and color. Thus, the amplitude level is detected as a target that represents luminance and subjected to processing by the image-processing circuit 140 provided at a subsequent stage. Accordingly, it is possible to keep the luminance or brightness of images constant by stabilizing the amplitude level.

Here, the operation of the digital camera 1 shown in FIGS. 3(a), 3(b) and 4 will be briefly described.

Upon turning on of the power switch (not shown) of the digital camera 1 shown in FIGS. 3(a) and 3(b), the system control circuit 110 starts shooting processing by controlling the operation of the entire digital camera 1 in accordance with a procedure described in an overall processing program stored in a nonvolatile memory 1101 shown in FIG. 4. In this example, in order to save the power of a battery Bt, the system control circuit 110 (the power from the battery Bt is constantly supplied to the system control circuit 110) is so configured as to supply the power to each block from the battery Bt via a power controller 111b, only when the power switch (not shown) of the digital camera 1 is turned on and then the turning on of the power switch is detected by the system control circuit 110.

With reference to FIG. 4, there will be briefly described the configuration and operation of processing sections related to the shooting processing that is performed in the digital camera 1 in the active state with the power being thus supplied to each block.

The shooting lens group 1021 including the focus lens and zoom lens, and the diaphragm 1041 for adjusting the amount of light shown in FIG. 4 are disposed in the lens barrel 100 shown in FIG. 3(a). In addition, a lens barrier 1011 for protecting the lenses is provided in this example. Upon turning on of the power switch, the system control circuit 110 causes a barrier controller 1010 to open the lens barrier 1101 so that the shooting lens group 1021 is exposed as shown in FIG. 3(a).

If the mode switch 103 is in the shooting mode side when the power switch is turned on, a subject image passing through the exposed shooting lens group 1021 is formed on the CCD 120 and output as a through (live) image after being thinned out at predetermined intervals (e.g. per 1/30 s) based on timing signals output from the timing generator circuit 121. Image signals representing the output through image (hereinafter referred to as "through-image signal") are subjected to analog-to-digital signal conversion by the A/D conversion circuit 130. Subsequently, under the control of a memory control section 111a, the digital through-image signals are transmitted to the image-processing circuit 140 where the through-image signals are subjected to RGB-to-YC signal conversion. Further, under the control of the memory control section 111a, the YC through-image signals are transmitted to and stored in a memory 151 for storing images to be displayed. Through-image signals for one frame stored in the memory 151 is read out by the memory control section 111a and transmitted to a D/A conversion circuit 160. The through-image signals are then converted into analog through-image signals by the D/A conversion circuit 160 and supplied to an image display section 150. In this example, the memory 151 is provided in order to supply new through-image signals at predetermined intervals to the image display section 150, and through-image signals representing each of at least two frames are stored in the memory 151, so that display timing can be well adjusted.

Now, the operation of each section will be described in detail in the flow of through-image signals.

Under the control of the system control circuit 110, through-image signals, which represent a subject image formed through the shooting lens group 1021 on the light-receiving surface of the CCD 120, are output to the A/D conversion circuit 130 in synchronism with timing signals (per 1/30 s) generated by the timing generator circuit 121. The A/D conversion circuit 130 applies analog-to-digital signal conversion to the through-image signals and transmits the obtained digital through-image signals to the image-processing circuit 140 under the control of the system control circuit 110. Subsequently, the image-processing circuit 140 divides the digital through-image signals into red-color, green-color and blue-color signals. The image-processing circuit 140 then supplies these RGB color signals to the color-temperature measuring circuit 141, and also to the memory 151 after converting these RGB color signals into YC signals by using color transformation matrix. The color-temperature measuring circuit 141 measures color temperatures of the received RGB color signals. Upon completion of this color measurement, gains corresponding to values obtained by the color measurement are set in the respective color amplifiers (the amplifiers may be collectively referred to merely as one "amplifier" for convenience of explanation) of the white-balance adjusting section provided in the system control circuit 110 and then, white-balance adjustment is made to the image-signals.

Meanwhile, the YC signals supplied to the memory 151 are stored therein. The memory 151 stores image signals representing each of at least two frames, and the image signals representing one of the frames stored earlier are transmitted to the D/A conversion circuit 160 and supplied to the image display section 150 after being converted into analog signals. Subsequently, image signals representing the other frame stored later are processed in a similar manner. In this way, image signals representing each frame are supplied to the image display section 150 in a first-in first-out manner, so that a through image is constantly displayed on the display screen 1501.

As described above, the system control circuit 110 performs TTL distance measurement and instructs the distance-measurement controller 1030 to constantly move the focus lens (included in the shooting lens group 1021) to a focus based on a result of the TTL distance measurement. Also, the system control circuit 110 instructs, in response to the zoom switch 106 being operated by a user, the zoom controller 1020 to move the zoom lens (included in the shooting lens group 1021) to a position according to a magnification set by user operation through the zoom switch 106.

In response to a press of the release button 104 in the state when a through image in constant focus under the magnification set by the user operation through the zoom switch 106 is displayed, shooting processing begins. The following description will assume that the continuous shooting mode is selected as a shooting mode and shooting will be performed in this condition.

In response to the press of the release button 104, the system control circuit 110 notifies the timing generator circuit 121 of the time when the release button 104 was pressed. Upon receipt of such notification, the timing generator circuit 121 starts supplying exposure signals to the CCD 120 from the time when the release button 104 was pressed and keeps supplying the exposure signals to the CCD 120 at predetermined intervals (1/30 s) until the release button 104 is to be pressed again. If the system control circuit 110 determines that emission of fill light is necessary for the next shooting based on the result of TTL metering carried out at each shooting, the system control circuit 110 instructs the light-amount controller 112 to emit fill light at the next shooting.

The light-emitting section 11 of the embodiment has the LED 114 and causes the LED 114 to emit fill light for shooting to a subject. Like the conventional LED as described above, the LED 114 also has a similar problem that when emission of light from the LED 114 is repeated in synchronism with shooting, the amount of light emitted from the LED 114 gradually decreases due to a gradual increase in its temperature and thus, the brightness of images becomes lower as the number of shot images increases.

Accordingly, in order to compensate for the gradually decreased amount of light, the system control circuit 110 in the embodiment causes the gain changer 130a to increase the gain of the amplifier incorporated in the A/D conversion circuit 130, thereby amplifying the signals to stabilize the level of the image signals. The amplifier in the A/D conversion circuit 130 shown in FIG. 4 has a gain-changing terminal. The system control circuit 110 counts the number of shot images with the counter provided in the system control circuit 110, reads out a gain corresponding to the number of shot images from data stored in the form of a table, and notifies the gain changer 130a of the read-out gain. Subsequently, the gain changer 130a supplies a signal representing the received gain to the gain-changing terminal of the amplifier, so that the amplifier can amplify image signals to compensate for the amount of light gradually decreased due to a gradual increase in temperature.

While the image signals are thus gradually amplified as the gain of the amplifier in the A/D conversion circuit 130 is increased by the gain changer 130a so as to compensate for the amount of light decreased due to an increase in temperature, shootings are sequentially performed during continuous shooting. Accordingly, signal images obtained through the continuous shooting are sequentially stored in a storage medium such as the memory card 300.

After the image signals that represent images of predetermined constant brightness are sequentially stored in the memory card 300 while the decreased amount of light emitted from the LED 114 is compensated for by the increased gain, image data representing the stored image signals is read out from the memory card 300 and images represented by the imaged at a are displayed as replayed images. Accordingly, all images from the first to the last one taken during the continuous shooting are displayed on the display screen 1501 as images of the same brightness.

Now, there will be described steps in processing performed by the system control circuit 110 with reference to FIG. 5.

Figure 5:
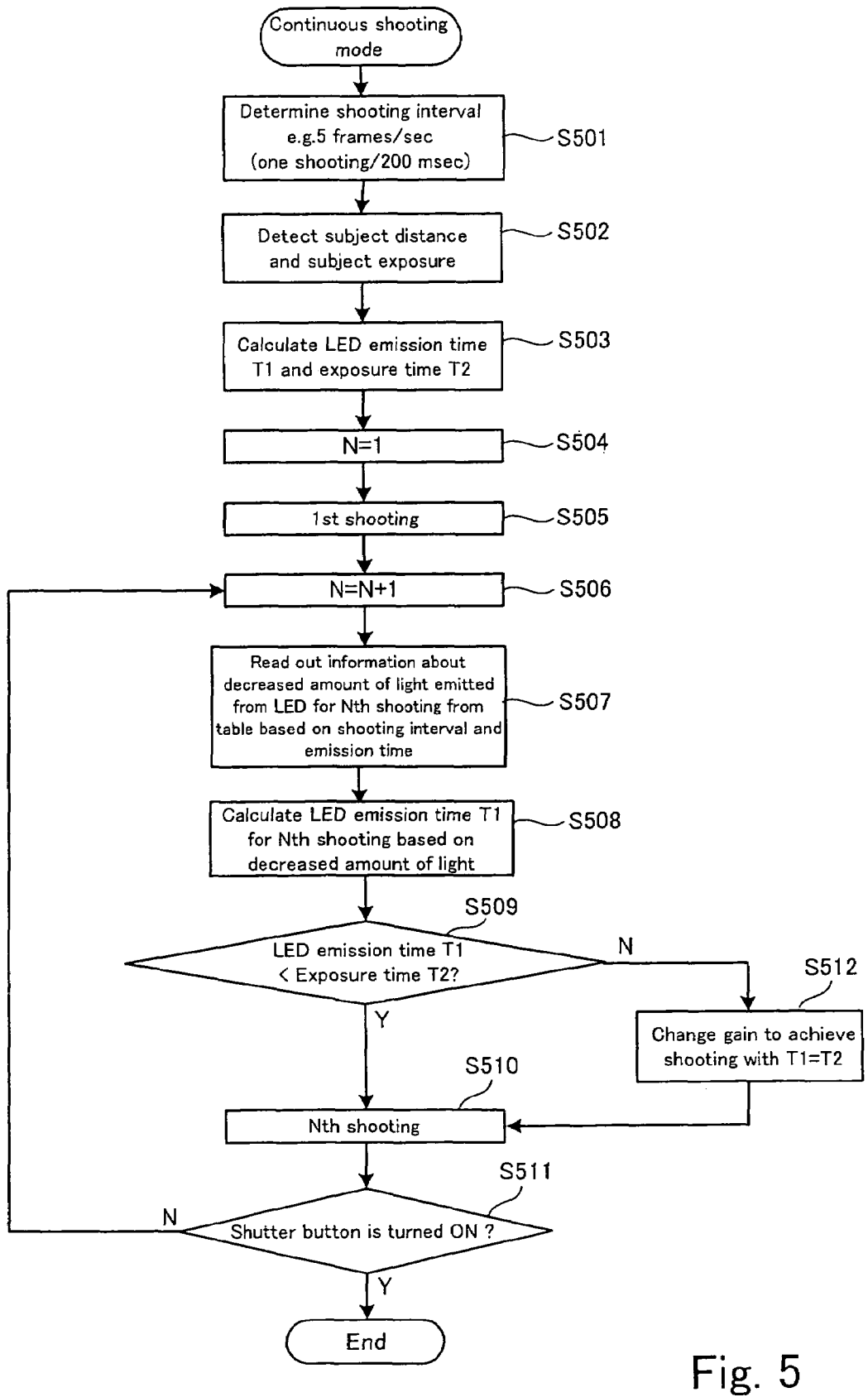
FIG. 5 is a flowchart showing processing performed by a system control circuit when a continuous shooting mode is selected.

FIG. 5 is a flowchart showing the processing performed by the system control circuit 110 when the continuous shooting mode is selected. FIG. 5 illustrates processing steps that are performed by the system control circuit 110 during continuous shooting. The system control circuit 110 performs steps for keeping the constant level of image signals for every frame, by instructing the gain changer 130a to increase the gain of the signal amplifier in the A/D conversion circuit 130. As a result, there is achieved compensation for the amount of light from the LED 114 that is gradually decreased due to a gradual increase in the temperature of the LED 114 when the LED 114 repeats light emission in synchronism with shootings.

As shown in FIG. 5, at step S501, the system control circuit 110 reads in a time interval for continuous shooting designated by user operation. In the following description, it is assumed that five frames per second (5 shootings per 200 ms) are shot during continuous shooting.

Subsequently, the flow proceeds to step S502 where the system control circuit 110 determines a distance to a subject and an exposure value based on results of TTL distance measurement and TTL metering, respectively. Then, the system control circuit 110 calculates a shutter speed (sec) T2 as exposure time based on the exposure value obtained at step S503 and calculates emission time T1 over which fill light is emitted at shooting. The emission time T1 is supposed not to exceed the exposure time T2 at this stage, because the LED 114 is in a stable state and thus its temperature has not yet increased.

Subsequently, the flow proceeds to step S504 where the system control circuit 110 sets an initial value N=1 in the counter, and then to step S505 where the first shooting is performed. Upon completion of the first shooting, the system control circuit 110 increments the counter value to N=2 at step S506 and prepares for the second shooting. In this case, one shooting is performed per 200 ms set as the shooting interval. Therefore, the system control circuit 110 reads out information about the decreased amount of light emitted from the LED 114 from the table at step S507 based on the shooting interval 200 ms and the emission time T1 used at the first shooting, and calculates emission time T1 for the second shooting at step S508 based on the obtained information.

When the amount of light emitted from the LED 114 has gradually decreased as its temperature has gradually increased, correct exposure cannot be mathematically achieved unless the LED 114 emits light under the condition that the emission time T1 is longer than the exposure time T2. Therefore, the system control circuit 110 compares the emission time T1 with the exposure time T2 at step S509. If the system control circuit 110 determines that the emission time T1 is shorter than the exposure time T2, the flow proceeds to step S510 (Yes, route) where the system control circuit 110 causes the LED 114 to emit fill light to the subject over the emission time T1 calculated at step S508. If the system control circuit 110 determines that the emission time T1 is longer than the exposure time T2, the flow proceeds to step S512 (No route) where the system control circuit 110 causes the gain changer 130a to change the gain of the amplifier in the A/D conversion circuit 130, so that the emission time T1 and the exposure time T2 become equal to each other. Then, the flow proceeds to step S510 where the second shooting is performed and further to step S511 where the system control circuit 110 determines whether the release button 104 is pressed again or not. If the system control circuit 110 determines that the release button 104 is not pressed again (No route), the flow returns to step S506 where the system control circuit 110 increments the counter value N and then starts processing for the third shooting.

Afterwards, steps S506 through S511 are repeated until the release button 104 is pressed again.

In this way, even if the amount of light emitted from the LED 114 gradually decreases because of a gradual increase in its temperature due to an increase in the number of shot images, the system control circuit 110 stabilizes the level of image signals, by causing the gain changer 130a to adjust the gain of the amplifier in the A/D conversion circuit 130 at steps S509 and S512 so that the emission time T1 and the exposure time T2 become equal to each other. As is well known, the level of image signals corresponds to luminance (Y) and thus, the brightness of images represented by the image signals can be maintained at a constant level.

Now, the contents of the processing shown in FIG. 5 will be described with reference to FIG. 6 for easy understanding of this processing.

Figure 6:
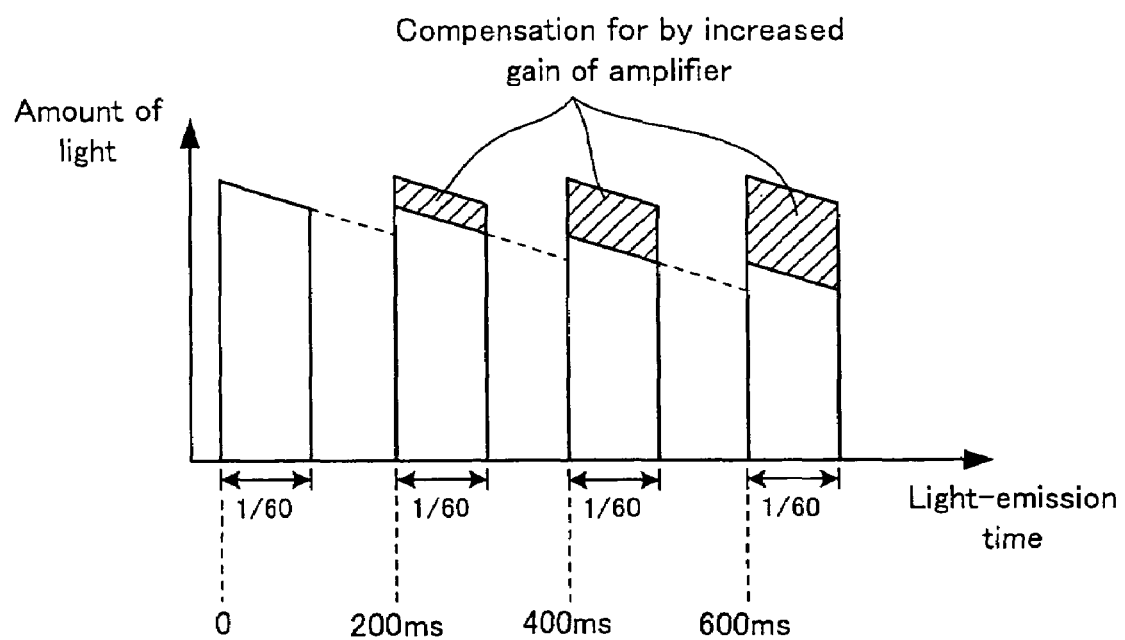
FIG. 6 is a graph showing how the amount of light emitted from an LED at each shooting time gradually decreases during, for example, continuous shooting requiring fill-light emission.

FIG. 6 is a graph showing how the amount of light emitted from the LED 114 at each shooting time gradually decreases during, for example, continuous shooting requiring fill-light emission. In the example shown in FIG. 6, it is assumed that light is fully emitted at each shooting.

As shown in FIG. 6, the temperature of the LED 114 gradually increases and thus the amount of emitted light gradually decreases, as the number of shooting times (i.e. the number of shot images) increases. In order to compensate for the decreased amount of emitted light, the system control circuit 110 causes the gain changer 130a to increase the gain of the amplifier in the A/D conversion circuit 130 so that the amplifier amplifies image signals as much as the decreased amount of emitted light. A gradual decrease in the amount of light emitted from the LED 114 means a gradual decrease in the amount of light received by the CCD 120 and thus, the amount of electric charge obtained in proportion to the amount of light received by the CCD 120 also decreases. The system control circuit 110 causes the amplifier to carry out amplification that compensates for the decreased amount of electric charge.

Because the amount of light from the LED 114, which is decreased due to an increase in its temperature, is thus compensated for by the amplification of the gain of the amplifier in the A/D conversion circuit 130, it is possible to obtain images of the same brightness at all shootings during continuous shooting.

As described above, according to the embodiment, there is realized an image-taking apparatus that keeps the brightness of images shot later equal to that of images shot earlier during continuous shooting, without increasing the number of LEDs.

The example described with reference to FIGS. 5 and 6 maintains constant brightness of images from the beginning to the end of continuous shooting by causing the gain changer 130a to increase the gain of the amplifier in the A/D conversion circuit 130 according to the number of shot images. Alternatively, the brightness of images may be made constant by increasing the amount of fill light according to the number of shot images.

In order to increase the amount of fill light, it is necessary to raise the driving level required for driving the LED 114 so as to compensate for the amount of light decreased according to the number shot of images. The driving level corresponds to the amount of power that the LED requires for emitting a predetermined amount of light. Therefore, for example, the electric current for driving the LED 114 may be increased or the time for driving the LED 114 may be extended so as to increase the driving level.

Meanwhile, it is also possible to cause the LED 114 to emit light by sequentially supplying repeated pulses to the LED 114, and by changing the duty ratio between the repeated pulses so that the power supplied to the LED 114 can be adjusted. When the LED 114 is driven by means of the repeated pulses in this way, it is possible to raise the driving level by bringing the duty ratio closer to 1.

Now, there will be described an example of the way of maintaining the amount of light emitted at the first through the last shootings from the LED 114 at a constant level, by gradually extending the time for driving the LED 114 and thereby increasing the amount of power supplied to the LED 114.

Figure 7:
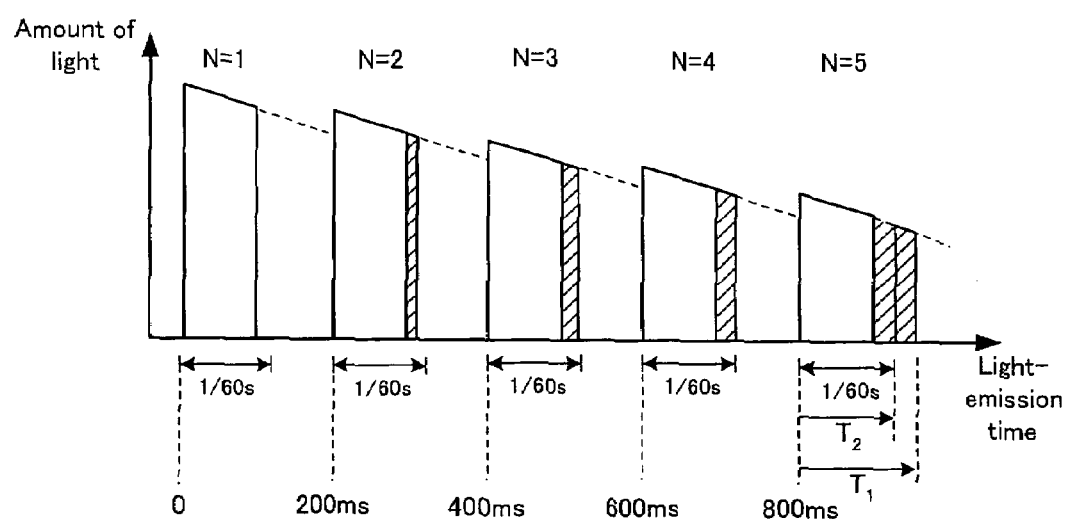
FIG. 7 is a graph showing an example of away of maintaining the amount of light emitted from the LED at the first through the last shootings at a constant level, by gradually extending the time for driving the LED and thereby increasing the amount of power supplied to the LED.

FIG. 7 is a graph showing such an example.

In this example, as shown in FIG. 7, five frames are shot per second and light is emitted from the LED 114 over exposure time T2 of 1/60 s for each frame. The amount of light from the LED 114 gradually decreases as the number of frames, i.e. the number of shot images, increases. Therefore, the time for driving the LED 114 is gradually extended. Light emission per frame is within the exposure time T2 of 1/60 s at the first through fourth frames. However, prescribed emission time T1 is longer than the exposure time T2 at the last (fifth) frame.

Thus, at the last frame, the system control circuit 110 instructs the timing generator circuit 121 to make the exposure time T2 equal to the emission time T1, so that the light-emitting section 11 enables the LED 114 to emit light over the exposure time made equal to the emission time T1. Accordingly, the amount of light equal to that of the preceding frames can be maintained at the last frame and thus, the brightness of the frames shot earlier and that of the last frame can be made approximately the same. In this example, the combination of the system control circuit 110 and the timing generator circuit 121 corresponds to an example of the "exposure section" according to the invention.

Figure 8:
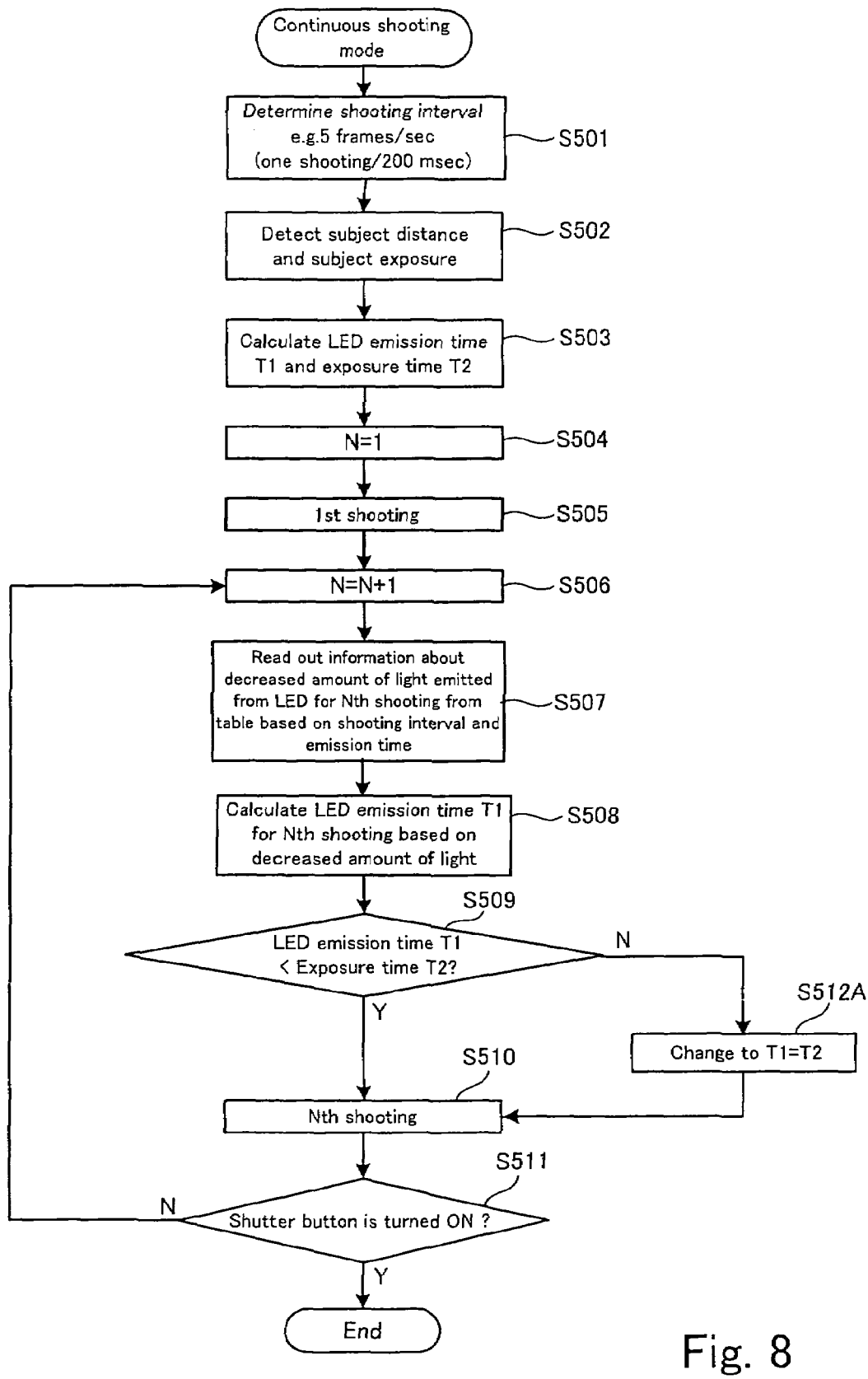
FIG. 8 is a flowchart showing processing for continuous shooting performed by the system control circuit.

FIG. 8 is a flowchart showing processing for continuous shooting performed by the system control circuit 110 in this example.

FIG. 8 is similar to FIG. 5 except for step S512A.

In the flowchart shown in FIG. 5, the system control circuit 110 increases the gain of the amplifier provided in the A/D conversion circuit 130 at step S512. In FIG. 8 however, the system control circuit 110 has been improved such that the system control circuit 110 instructs the timing generator circuit 121 to delay the timing of supplying the CCD 120 with an exposure-ending signal, thereby making emission time T1 and exposure T2 equal to each other at step S512A.

This improved example can also realize an image-taking apparatus capable of maintaining the brightness of all images shot during continuous shooting at a constant level, without increasing the number of LEDs.

Alternatively, an interval (shooting interval) between one shooting and the next shooting may be changed so as to extend the time required for cooling the LEDs.

Figure 9:
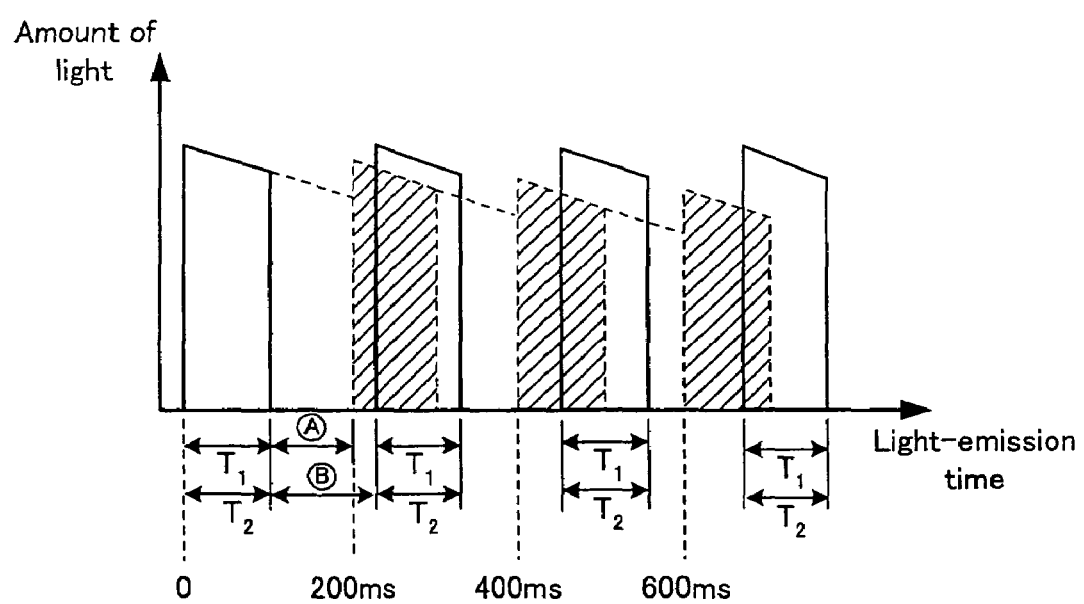
FIG. 9 is a diagram showing an example where a shooting interval for continuous shooting is changed.

FIG. 9 is a diagram showing such an example where a shooting interval for continuous shooting is changed. In this example, light is also fully emitted at each shooting time.

FIG. 9 illustrates a gradually increased amount of emitted light in each of the state when light is emitted at normal shooting intervals and the state when light is emitted at changed shooting intervals, indicated with dotted lines and solid lines, respectively.

As shown in FIG. 9, a shooting is supposed to be carried out per 200 ms, in order to shoot five frames per second. In this example however, the time interval for continuous shooting is extended from 200 ms to, for example, 250 ms or 300 ms, and the LED 114 is cooled over this extended interval in order to suppress an increase in the temperature of the LED 114. FIG. 9 shows a change in the amount of light emitted from the LED 114 at normal shooting intervals with the dotted lines, while showing a change in the amount of light emitted from the LED 114 at shooting intervals extended according to the number of shot images with the solid lines. In either case, light is fully emitted at each shooting time.

As shown in FIG. 9, when the shooting interval is thus extended, the LED 114 can be cooled to the normal temperature for operation and therefore, there will be no increase in the amount of emitted light along with the number of shot images. In this example, the shooting interval is selected such that light emission over emission time T2 can be made equal to the initial emission time T1, and light is emitted from the LED 114 over this emission time T2 during continuous shooting. Specifically, as shown in FIG. 9, exposure and light emission are normally carried out at shooting intervals A, but the shooting interval is extended to B so that the LED 114 is cooled to the normal temperature for operation before the next emission.

When a sufficient cooling duration is secured by extending the shooting interval in this way, an approximately constant amount of light is obtained for each shooting frame and thus, it is possible to keep emitting sufficient amount of light from the beginning to the end of continuous shooting.

Figure 10:
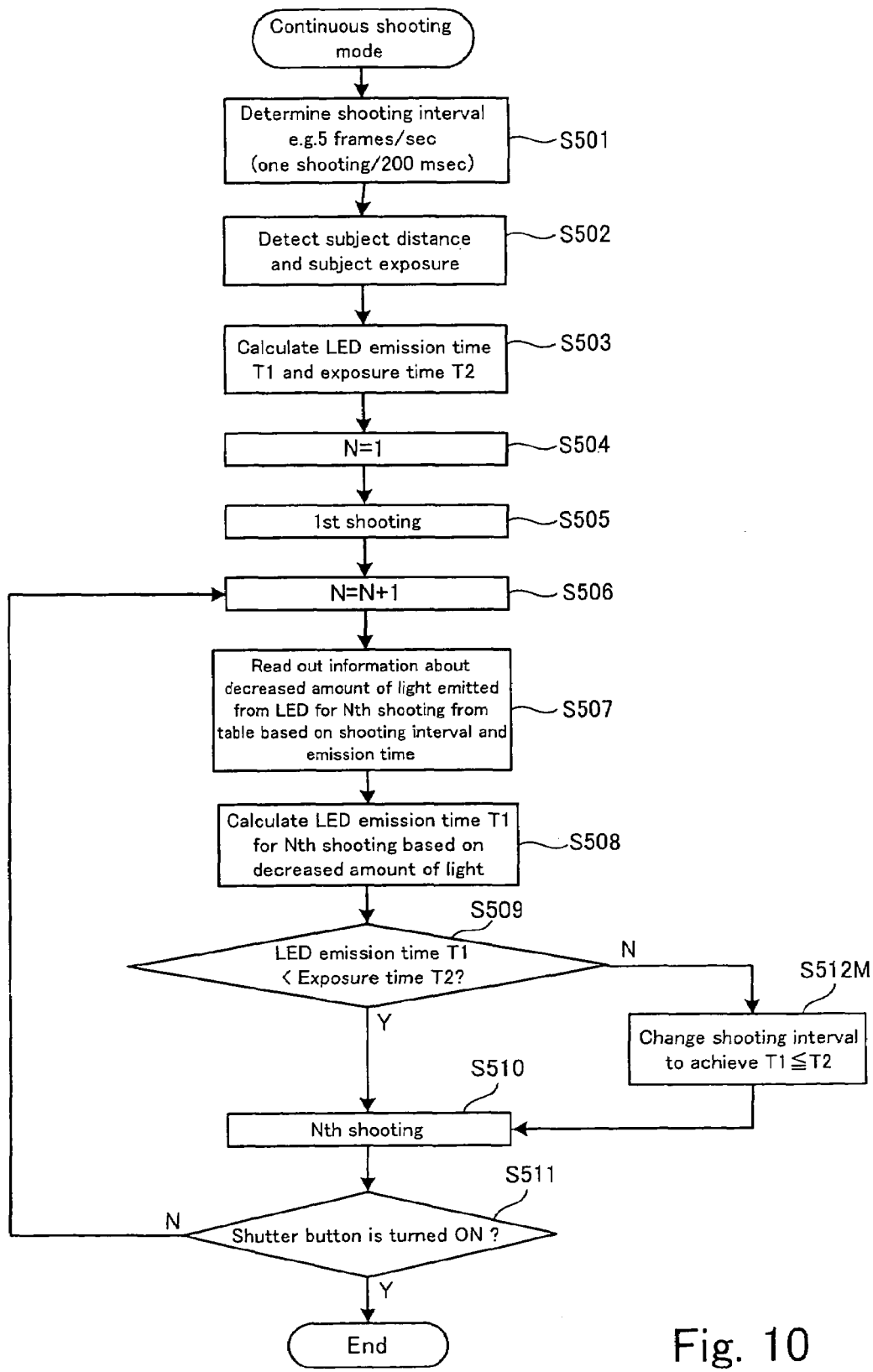
FIG. 10 is a flowchart showing processing for continuous shooting described with reference to FIG. 9, which is performed by the system control circuit.

FIG. 10 is a flowchart showing processing for continuous shooting described with reference to FIG. 9, which is performed by the system control circuit 110.

FIG. 10 is similar to FIG. 5 except for step S512M.

In the flowchart shown in FIG. 5, the system control circuit 110 increases the gain of the amplifier provided in the A/D conversion circuit 130 at step S512. In FIG. 10 however, the system control circuit 110 changes the shooting interval such that emission time T1 becomes equal to or below exposure time T2 at step S512M, and thus shooting for the next frame is performed based on the changed interval. Specifically, the system control circuit 110 instructs the timing generator circuit 121 to delay the timing of supplying the CCD 120 with an exposure-starting signal, so that fill light is emitted without fail within the exposure time T2 that begins in response to the delayed exposure-starting signal. This example can also achieve the same effects as those obtained in the above-described examples.

In the examples described so far, data stored beforehand in the memory built in the system control circuit 110 is read out at step S507, in order to compensate for the decreased amount of light. However, a light-receiving sensor may be provided to monitor the amount of light emitted from the LED 114, so that the driving level for driving the LED 114 at the next shooting or the amplification factor of the amplifier can be determined based on the result of the monitoring.

Figure 11:
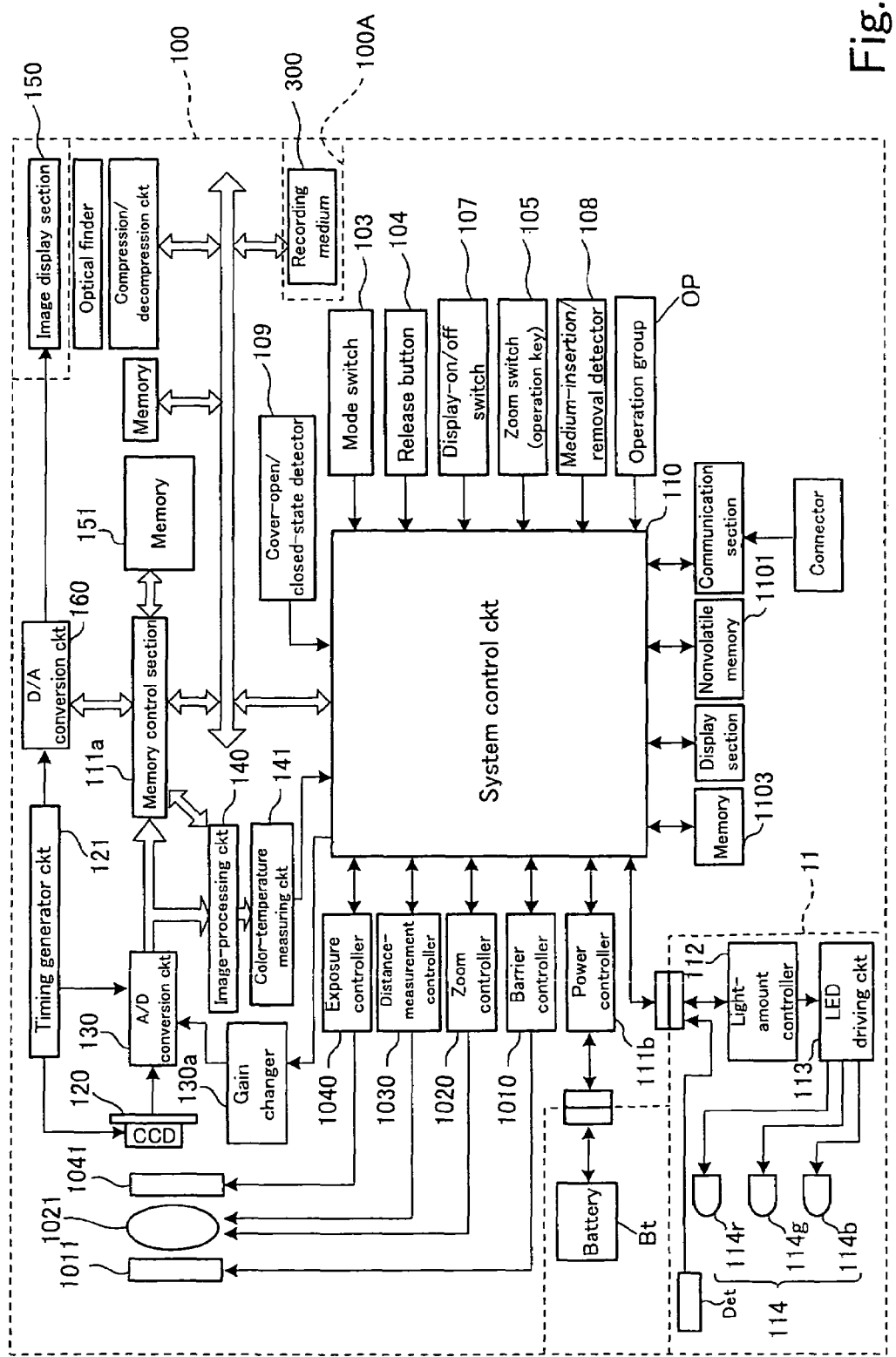
FIG. 11 is a block diagram illustrating the internal configuration to which a light-receiving sensor Det for monitoring is added.
Figure 12:
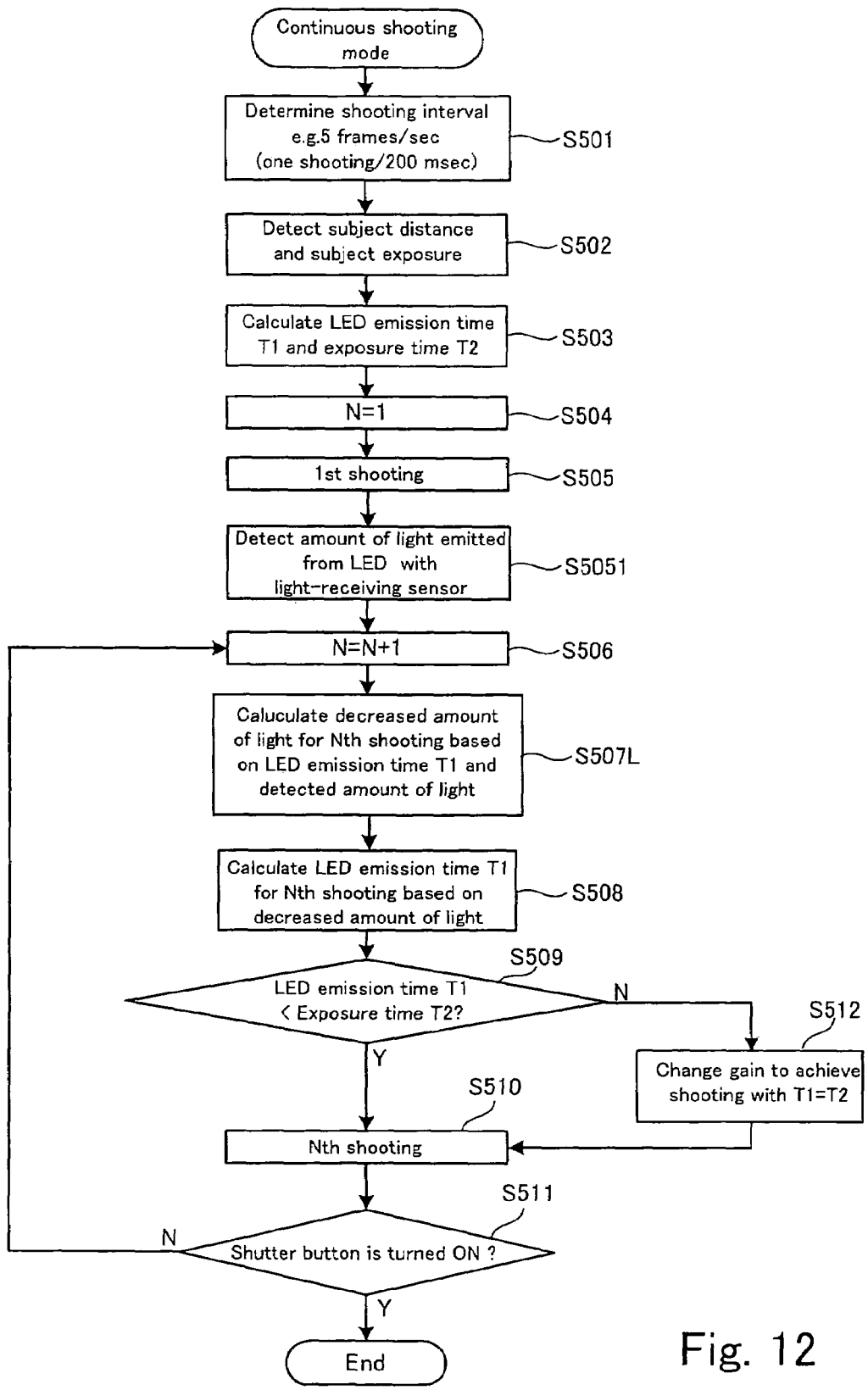
FIG. 12 is a diagram showing processing for changing the gain of an amplifier in an A/D conversion circuit shown in FIG. 11 in a manner similar to FIG. 5, based on the amount light detected by the light-receiving sensor Det, so as to secure a sufficient amount of light.
Figure 13:
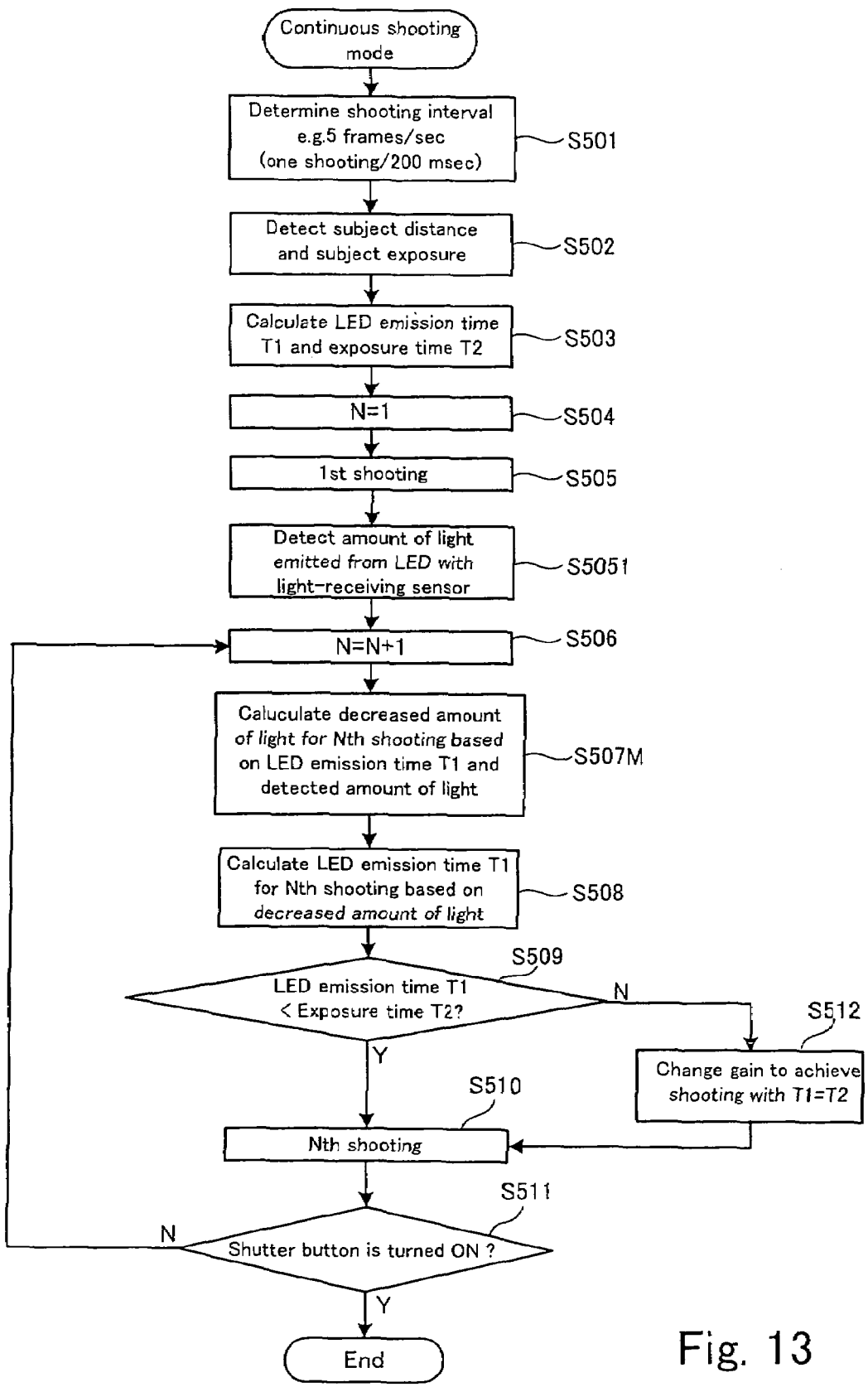
FIG. 13 a diagram showing processing for changing the emission time in a manner similar to FIG. 8, based on the amount light detected by the light-receiving sensor Det shown in FIG. 11, so as to secure a sufficient amount of light.
Figure 14:
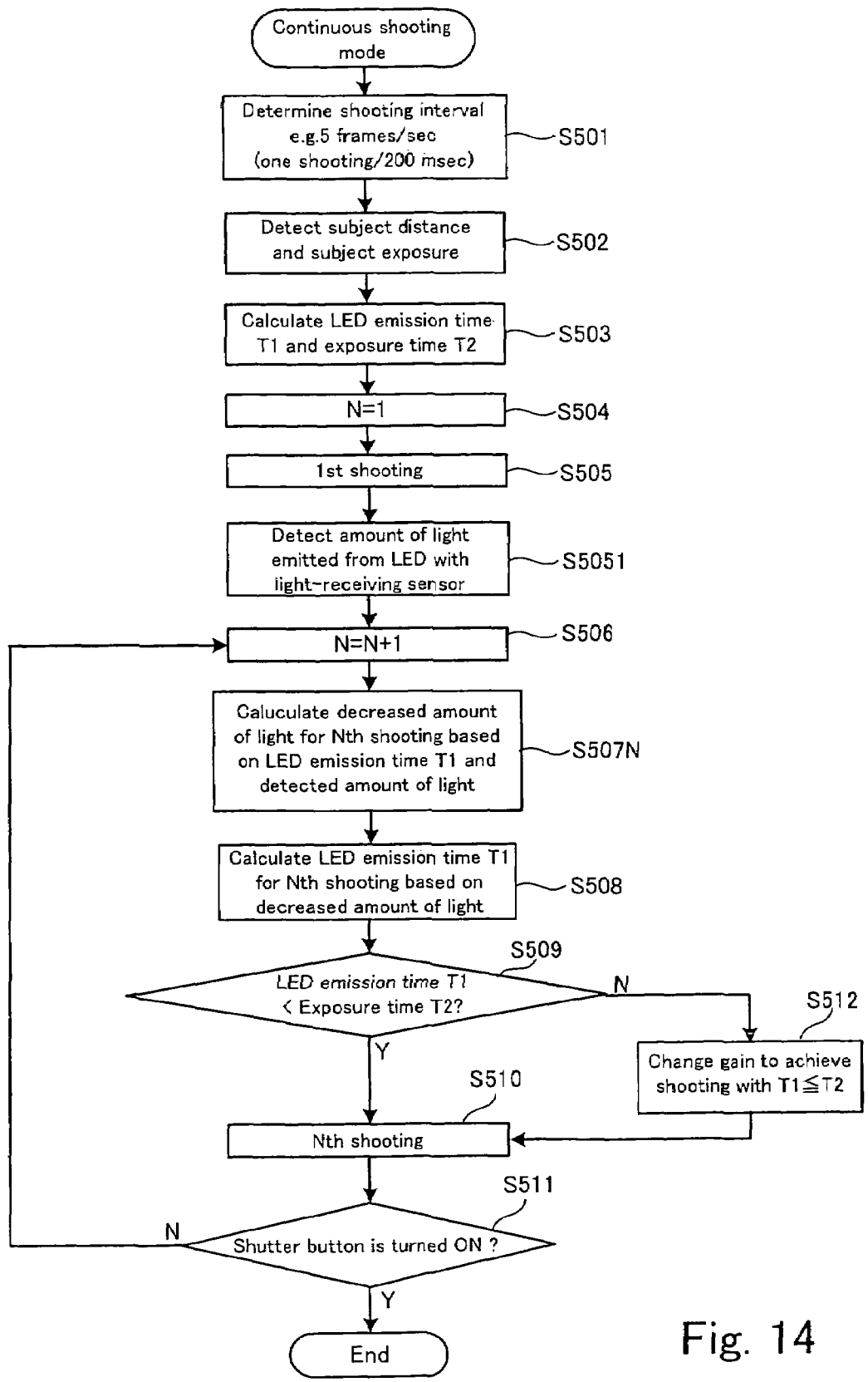
FIG. 14 a diagram showing processing for changing the shooting interval in a manner similar to FIG. 10, based on the amount light detected by the light-receiving sensor Det shown in FIG. 11, so as to secure a sufficient amount of light.

FIG. 11 is a block diagram illustrating the internal configuration to which a light-receiving sensor Det for monitoring the amount of light is added. FIGS. 12 through 14 are flowcharts showing processing performed by the system control circuit 110, in which the next shooting is carried out with the same amount of light from the LED 114 as the previous shooting, based on the amount of light detected by the light-receiving sensor Det shown in FIG. 11.

FIG. 12 shows processing for changing the gain of the amplifier in the A/D conversion circuit 130 in a manner similar to FIG. 5, FIG. 13 shows processing for changing the emission time in a manner similar to FIG. 8, and FIG. 14 shows processing for changing the shooting interval in a manner similar to FIG. 10.

The configuration shown in FIG. 11 is similar to FIG. 4 except that the light-receiving sensor Det for monitoring the amount of light is added.

FIGS. 12, 13 and 14 each show step S5051 where the amount of light emitted from the LED 114 for each shooting frame is detected by the light-receiving sensor Det. Step S5051 is added in place of step S507 where an efficiency-lowering rate (amount of gradual decrease) of the light emitted from the LED 114 is read out from the table as shown in FIGS. 5, 8 and 10. FIGS. 12, 13 and 14 also show step S507L, step S507M, step S507N, respectively, where the decreased amount of light is calculated based on the detected amount of light. Otherwise, FIGS. 12, 13 and 14 are similar to FIGS. 5, 8 and 10, respectively.

When the light-receiving sensor Det is added to monitor the amount of light emitted from the LED 114 at each shooting in this way, it is possible to set the gain of the amplifier, to increase the driving level for driving the LED, or to change the shooting interval, in order to more precisely compensate for a decrease in the efficiency lowering rate (amount of gradual decrease) for each shooting frame.

As described above, there are realized the image-taking apparatus capable of keeping the brightness of images shot later equal to the brightness of images shot earlier among images shot in continuous shooting, without increasing the number of LEDs.

What is claimed is:

1. An image-taking apparatus that includes an imaging device and an image-taking optical system, and generates per-shooting image signals representing a subject image formed on the imaging device through the image-taking optical system, the apparatus comprising:
    a light-emitting section that includes an LED and causes the LED to emit fill light toward a subject;
    a light-emission driving section that drives the LED in synchronism with a shooting requiring fill light; and
    a signal-amplifying section that amplifies the image signals by increasing an amplification factor according to the number of shot images, up to a level that compensates for a gradual decrease in the amount of emitted light that occurs due to an increase in temperature of the LED, while the LED is repeating light emission in synchronism with every shooting, during continuous shooting requiring fill light.

2. An image-taking apparatus that includes an imaging device and an image-taking optical system, and generates per-shooting image signals representing a subject image formed on the imaging device through the image-taking optical system, the apparatus comprising:
    a light-emitting section that includes an LED and causes the LED to emit fill light toward a subject; and
    a light-emission driving section that drives the LED in synchronism with a shooting requiring fill light,
    wherein the light-emission driving section raises a driving level for driving the LED according to the number of shot images, up to a level that compensates for a gradual decrease in the amount of emitted light that occurs due to an increase in temperature of the LED while the LED is repeating light emission in synchronism with every shooting during continuous shooting requiring fill light.

3. The image-taking apparatus according to claim 2, further comprising an exposure section that adjusts exposure time such that the exposure time becomes equal to or above emission time over which the LED emits light at a single shooting, during continuous shooting requiring fill light.

4. An image-taking apparatus that includes an imaging device and an image-taking optical system, and generates per-shooting image signals representing a subject image formed on the imaging device through the image-taking optical system, the apparatus comprising:
    a light-emitting section that includes an LED and causes the LED to emit fill light toward a subject;
    a light-emission driving section that drives the LED in synchronism with a shooting requiring fill light; and
    a shooting control section that extends a shooting interval according to the number of shot images, up to a length that prevents a decrease in the amount of emitted light that occurs due to an increase in temperature of the LED, while the LED is repeating light emission in synchronism with every shooting, during continuous shooting requiring fill light.

5. An image-taking apparatus that includes an imaging device and an image-taking optical system, and generates per-shooting image signals representing a subject image formed on the imaging device through the image-taking optical system, the apparatus comprising:
- a light-emitting section that includes an LED and a light-amount monitor for monitoring the amount of light emitted from the LED, and causes the LED to emit fill light toward a subject;
- a light-emission driving section that drives the LED in synchronism with a shooting requiring fill light; and
- a signal-amplifying section that determines, based on a value obtained by the light-amount monitor as a result of monitoring a change in the amount of light emitted from the LED that occurs while the LED is repeating light emission in synchronism with every shooting during continuous shooting requiring fill light, an amplification factor for amplifying image signals to be obtained at a subsequent shooting, and amplifies the image signals obtained at the subsequent shooting with the determined amplification factor.

6. An image-taking apparatus that includes an imaging device and an image-taking optical system, and generates per-shooting image signals representing a subject image formed on the imaging device through the image-taking optical system, the apparatus comprising:
- a light-emitting section that includes an LED and a light-amount monitor for monitoring the amount of light emitted from the LED, and causes the LED to emit fill light toward a subject; and
- a light-emission driving section that drives the LED in synchronism with a shooting requiring fill light,
- wherein the light-emission driving section determines, based on a value obtained by the light-amount monitor as a result of monitoring a change in the amount of light emitted from the LED that occurs while the LED is repeating light emission in synchronism with every shooting during continuous shooting requiring fill light, a driving level to be used for driving the LED at a subsequent shooting, and drives the LED with the determined driving level at the subsequent shooting.

7. The image-taking apparatus according to claim 6, further comprising an exposure section that adjusts exposure time such that the exposure time becomes equal to or above emission time over which the LED emits light at a single shooting, during continuous shooting requiring fill light.

8. An image-taking apparatus that includes an imaging device and an image-taking optical system, and generates per-shooting image signals representing a subject image formed on the imaging device through the image-taking optical system, the apparatus comprising:
- a light-emitting section that includes an LED and a light-amount monitor for monitoring the amount of light emitted from the LED, and causes the LED to emit fill light toward a subject;
- a light-emission driving section that drives the LED in synchronism with a shooting requiring fill light; and
- a shooting control section that adjusts an interval between shootings, based on a value obtained by the light-amount monitor as a result of monitoring a change in the amount of light emitted from the LED that occurs while the LED is repeating light emission in synchronism with every shooting during continuous shooting requiring fill light.

* * * * *